Patented May 5, 1942

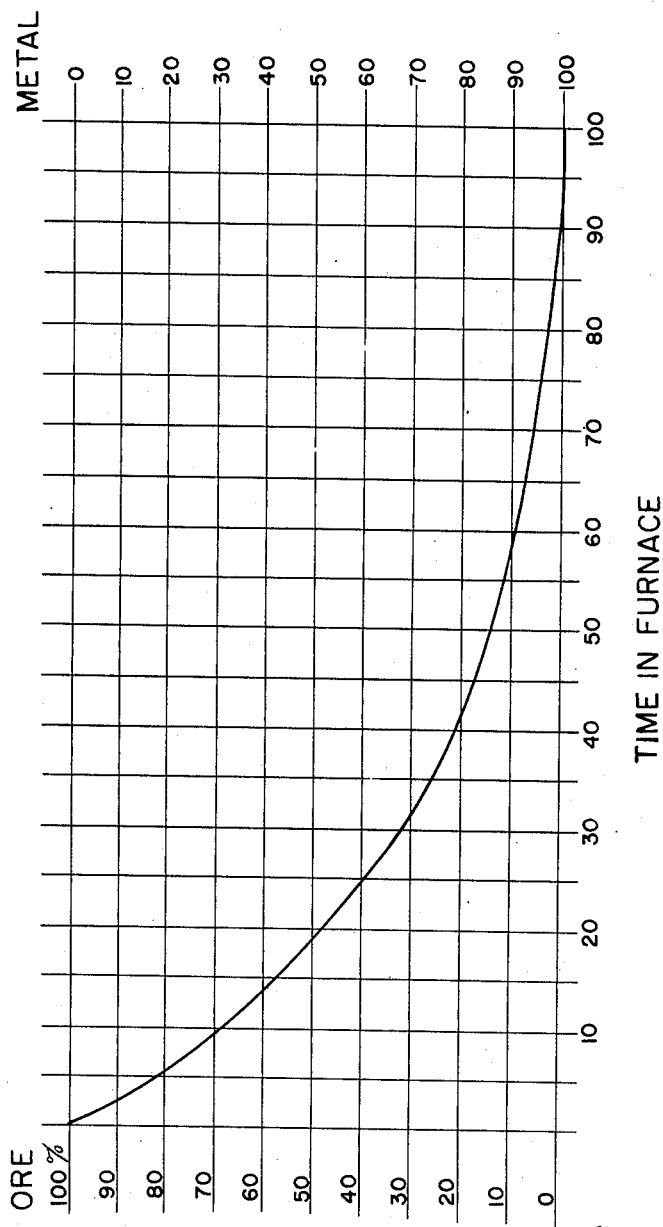

2,282,144

UNITED STATES PATENT OFFICE 2,282,144

PRODUCTION OF SPONGE IRON

Frank A. Fahrenwald, Chicago, Ill.; Marjorie P. Fahrenwald executrix of said Frank A. Fahrenwald, deceased Application May 2, 1940, Serial No. 332,957

10 Claims. (Cl. 75—34)

My invention relates to the production of iron from its ores without fusion and includes among its objects and advantages the production of iron with controlled percentages of carbon, especially extremely small percentages previously unobtainable on a commercial scale, and the precise control of small percentages throughout a predetermined range.

My copending application, Serial Number 332,951, filed May 2, 1940, describes and illustrates a type of furnace chamber suitable for carrying out the hereindescribed processes.

In the accompanying drawing, the figure is a diagram indicating the rate at which iron oxide is changed to metallic iron as the ore bed passes through the reducing chamber. It will be noted that decomposition proceeds at a relatively rapid rate at the start and then continues more slowly according to the well known law of mass action, as the available remainder of unreduced ore decreases. In the specific curve given, which is of the type characteristic of operations in such a furnace, half the ore is decomposed during about the first quarter of the progress of the ore bed through the furnace.

I have found that as long as the remaining unreduced oxide represents at least 20% of the original mass, neither gamma iron nor alpha iron will absorb more than 0.035% carbon. By gamma iron I refer to the face-centered crystalline form stable when pure at 1670° F. or more, and by alpha iron I refer to the body-centered crystalline form stable when pure at temperatures below 1670° F.

But after 80% of the iron has been reduced, the mass action of the oxygen in the remaining unreduced iron begins to become less effective, and gamma iron, if present, will, in the presence of carbon monoxide, absorb higher percentages of carbon up to and beyond 0.800%, which percentage is commonly referred to as the eutectoid percentage.

Accordingly, the manipulative possibilities include procedures where the temperature is maintained throughout the furnace so that the reduced iron is present in the gamma form. A first procedure with such high temperatures throughout is to deliver to the ore bed throughout its travel reducing gases containing substantial percentages of carbon monoxide, in which case the finished iron can be delivered quite effectively with controlled, relatively high percentages of carbon.

A second procedure is to supply at the metal discharge end of the furnace a reducing gas devoid of carbon, specifically hydrogen, and to maintain an atmosphere containing no carbon in contact with all of that portion of the bed which is more than 80% reduced. In this way iron having various carbon contents up to substantially 0.035% can be delivered. And by varying the point at which a carbonaceous ingredient is added to the countercurrent of gas, under stable and continuous operating conditions, accurate control of carbon contents slightly above 0.035% can be secured, by making such additions when the ore is reduced to a predetermined degree beyond 80%.

To secure carbon content less than 0.035%, it is necessary to extend the zone of the hydrogen atmosphere toward the ore inlet of the furnace. As a matter of economy, under certain operating conditions, iron with somewhat less than 0.035% carbon can be secured by using hydrogen only for say the last 50% of the reduction, but where carbon content approximating 0.000 is desired, the saving is not worth while and hydrogen is used throughout the entire reduction. This control of carbon content below 0.035% is obtainable because, in the entire absence of carbon monoxide, and at the temperatures in question, hydrogen will remove the carbon from the iron to a limited extent.

And it is also possible to control the carbon content over part of the same range while employing throughout the entire process gases containing carbon monoxide.

In this instance the control may be secured by reducing the temperature of the ore bed to change the iron to alpha iron before the mass action of the unreduced iron oxide becomes ineffective. Specifically, such a temperature reduction when not more than 80% of the iron has been reduced, is effective to deliver a finished product with 0.035% carbon. By effecting this temperature reduction when the percentage of iron reduced is between 80% and 90%, various carbon contents between 0.035% and 0.05% are obtained. And by postponing the temperature drop to a slightly later point, other percentages above 0.05% can be obtained. Thus, the temperature drop is, in a general way, the equivalent of changing the gas to leave out the carbon monoxide, and cost considerations will be important in determining which expedient to use.

The exact point at which the temperature drop should be permitted to occur varies slightly on account of the combination of mass action, and the effect of the movement of the ore and the rate of gas supply, but can readily be determined by experiment. The exact percentages given are fairly approximate estimates and will be effective to enable those skilled in the art to secure the control of carbon as outlined herein.

Without further elaboration the foregoing will so fully explain my invention that others may, by applying knowledge current at the time of application, readily adapt the same for use under various conditions of service.

I claim:

1. The method of controlling the dissolved carbon content of sponge iron produced by reduction of iron oxide without fusion, which comprises: subjecting the heated ore to the action of hot reducing gases containing carbon monoxide; and when the reduction has proceeded to a predetermined degree, eliminating the carbon monoxide and substituting hydrogen; whereby a predetermined removal of the carbon previously dissolved is effected during the further reduction by hydrogen alone; the point at which the monoxide is eliminated being predetermined in accordance with the amount of carbon desired in the final product.

2. The method of controlling the dissolved carbon content of sponge iron produced by reduction of iron oxide without fusion, for percentages less than 0.035%, which comprises: subjecting the heated ore to the action of hot reducing gases, which gases contain both carbon monoxide and hydrogen during the initial stages of reduction; and when the reduction has proceeded to a predetermined degree, reducing the carbon absorption of the metallic iron by eliminating carbon monoxide from the reacting gases; and continuing the reduction of the ore with hydrogen only, whereby a predetermined removal of the carbon previously dissolved by the iron takes place; the point at which the monoxide is eliminated being predetermined in accordance with the amount of carbon desired in the final product.

3. The method of controlling the dissolved carbon content of sponge iron produced by reduction of iron oxide without fusion between percentages of 0.035 and 0.05, which comprises: subjecting the heated ore to the action of hot reducing gases containing carbon monoxide; and when the reduction has proceeded to a predetermined degree between 80% and 90%, reducing the carbon absorption of the metallic iron, by lowering the temperature to transform gamma iron to alpha iron; and continuing the reduction of the ore under the changed conditions.

4. The method of controlling the dissolved carbon content of sponge iron produced by reduction of iron oxide without fusion between percentages of 0.035 and 0.05, which comprises: subjecting the heated ore to the action of hot reducing gases, which gases contain both carbon monoxide and hydrogen; and when the reduction has proceeded to a predetermined degree between 80% and 90%, reducing the carbon absorption of the already metallic iron, by eliminating carbon monoxide from the reacting gases; and continuing the reduction of the ore under the changed conditions; the point at which the proportion of monoxide is reduced being predetermined in accordance with the amount of carbon desired in the final product.

5. The method of controlling the dissolved carbon content of sponge iron produced by reduction of iron oxide without fusion, which comprises: subjecting the heated ore to the action of hot reducing gases containing carbon monoxide; and when the reduction has proceeded to a predetermined degree, reducing the carbon absorption of the metallic iron, by lowering the temperature to transform gamma iron to alpha iron; and continuing the reduction of the ore under the changed conditions.

6. The method of controlling the dissolved carbon content of sponge iron produced by reduction of iron oxide without fusion, which comprises: subjecting the heated ore to the action of hot reducing gases containing carbon monoxide; and when the reduction has proceeded to a predetermined degree, reducing the carbon absorption of the metallic iron, by reducing the carbon monoxide and continuing the reduction with gas richer in hydrogen; the point at which the proportion of monoxide is reduced being predetermined in accordance with the amount of carbon desired in the final product.

7. The method of controlling the dissolved carbon content of sponge iron produced by reduction of iron oxide without fusion, which comprises: subjecting the heated ore to the action of hot reducing gases containing carbon monoxide; and when the reduction has proceeded to a predetermined degree, reducing the carbon absorption of the metallic iron, by eliminating carbon monoxide and continuing the reduction with hydrogen; the point at which the monoxide is eliminated being predetermined in accordance with the amount of carbon desired in the final product.

8. The method of controlling the dissolved carbon content of sponge iron produced by reduction of iron oxide without fusion, which comprises: subjecting the heated ore to the action of hot reducing gases, containing carbon monoxide; and when the reduction has proceeded to a predetermined degree, stopping the carbon absorption of the metallic iron; and continuing the reduction of the ore under the changed conditions; the point at which the carbon absorption is stopped being predetermined in accordance with the amount of carbon desired in the final product.

9. The method of controlling the dissolved carbon content of sponge iron produced by reduction of iron oxide without fusion, which comprises: subjecting the heated ore to the action of hot reducing gases containing carbon monoxide; and when the reduction has proceeded to a predetermined degree, reducing the carbon absorption of the metallic iron; and continuing the reduction of the ore under the changed conditions; the point at which the carbon absorption is reduced being predetermined in accordance with the amount of carbon desired in the final product.

10. The method of producing iron with a predetermined carbon content, which comprises: reducing hot iron ore to metallic iron without fusion, by reaction with gases including carbon monoxide; when the reduction has proceeded to a predetermined point transforming the metallic iron from gamma iron to alpha iron; and completing the reduction under the changed conditions.

FRANK A. FAHRENWALD.